United States Patent
Ishita et al.

(10) Patent No.: US 10,812,715 B2
(45) Date of Patent: Oct. 20, 2020

(54) IMAGING APPARATUS AND METHOD OF CONTROLLING IMAGING APPARATUS

(71) Applicant: CANON KABUSHIKI KAISHA, Tokyo (JP)

(72) Inventors: Shinya Ishita, Yokohama (JP); Takuma Yanagisawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/015,058

(22) Filed: Jun. 21, 2018

(65) Prior Publication Data

US 2018/0376066 A1 Dec. 27, 2018

(30) Foreign Application Priority Data

Jun. 27, 2017 (JP) .................................. 2017-125530
Nov. 14, 2017 (JP) .................................. 2017-219344

(51) Int. Cl.
*H04N 5/232* (2006.01)

(52) U.S. Cl.
CPC ..... *H04N 5/23254* (2013.01); *H04N 5/23258* (2013.01); *H04N 5/23287* (2013.01)

(58) Field of Classification Search
CPC ........... H04N 5/23254; H04N 5/23287; H04N 5/23258; H04N 5/144; G06T 2207/20201
See application file for complete search history.

(56) References Cited

U.S. PATENT DOCUMENTS

2016/0261784 A1* 9/2016 Mukunashi .......... H04N 5/2353

FOREIGN PATENT DOCUMENTS

JP  4-163535 A  6/1992

* cited by examiner

*Primary Examiner* — Ahmed A Berhan
(74) *Attorney, Agent, or Firm* — Canon U.S.A., Inc. IP Division

(57) ABSTRACT

An imaging apparatus includes a first calculation unit configured to calculate angular velocity of an object to the imaging apparatus, based on a detection result of a first detection unit that detects a motion vector of the object based on temporally-continuous images obtained by an image sensor and a detection result of a second detection unit that detects motion of the imaging apparatus, a second calculation unit configured to calculate angular acceleration of the object to the imaging apparatus, based on a plurality of angular velocities calculated by the first calculation unit, and a correction unit configured to move a correction component based on the angular velocity of the object to the imaging apparatus during exposure by the image sensor, and to correct image blur of the object.

13 Claims, 11 Drawing Sheets

IMAGING APPARATUS AND METHOD OF CONTROLLING IMAGING APPARATUS

BACKGROUND

Field of the Disclosure

The present disclosure relates to correction of image blur occurred in so-called follow shot imaging.

Description of the Related Art

In the related art, follow shot imaging has been known as imaging technique expressing a sense of speed of a moving object. In the follow shot imaging, a camera is panned by a photographer according to movement of the object, to cause the moving object to stop and to cause a background to flow. In the follow shot imaging, it is necessary for the photographer to pan the camera according to the movement of the object. If the panning speed is extremely high or low, difference occurs between the moving speed of the object and the panning speed, which may often cause blur object image.

Accordingly, in Japanese Patent. Application Laid-Open No. H4-163535, a part of an optical system of a lens or an imaging unit during exposure is moved based on relative angular velocity of the object to the imaging apparatus calculated before exposure and angular velocity of the imaging apparatus during exposure obtained from an angular velocity sensor, thereby correcting blur of the object (object blur). In addition, in Japanese Patent Application Laid-Open No. H4-163535, the relative angular velocity of the object the imaging apparatus is calculated from a moving amount of the object on an image plane detected from temporally-continuous images and an output of the angular velocity sensor.

In the technique discussed in Japanese Patent Application Laid-Open. No. H4-163535, however, the movement of the object is detected and the blur correction is performed; however, an error of the moving amount of the object on the image plane detected from the temporally-continuous images is not considered. To detect the moving amount of the object on the image plane from the temporally-continuous images, there a method of separating an object region and a background region with use of the output of the angular velocity sensor, and detecting a motion vector of the object region between the continuous images to detect the moving amount of the object on the image plane. In the method, in a case where the camera is slowly panned, it is difficult to separate the object region and the background region and to obtain the moving amount of the object on the image plane with high accuracy from the continuous images. Accordingly, the calculated relative angular velocity of the object to the imaging apparatus is shifted from the actual relative angular velocity, and the blur correction of the object is not performed with high accuracy in some cases.

SUMMARY

According to an aspect of the present disclosure, an imaging apparatus capable of performing a follow shot, includes at least one processor, the at least one processor functioning, according to a program stored in a memory, as a first detection unit configured to detect a motion vector of an object, based on temporally-continuous images obtained by an image sensor, a second detection unit configured to detect motion of the imaging apparatus, a first calculation unit configured to calculate angular velocity of the object to the imaging apparatus, based on a detection result of the first detection unit and a detection result of the second detection unit, a second calculation unit configured to calculate angular acceleration of the object to the imaging apparatus, based on a plurality of angular velocities calculated by the first calculation unit, and a correction unit configured to move a correction component based on the angular velocity of the object to the imaging apparatus during exposure by the image sensor, and to correct image blur of the object. The correction unit changes, according to the detection result of the second detection unit, a degree of a calculation result of the second calculation unit reflected when the angular velocity of the object to the imaging apparatus during exposure by the image sensor used in control of the correction component is determined.

Further features of the present disclosure will become apparent from the following description of exemplary embodiments with reference to the attached drawings.

DESCRIPTION OF THE EMBODIMENTS

Some exemplary embodiments of the present disclosure will be described below with reference to drawings.

Figure 3:
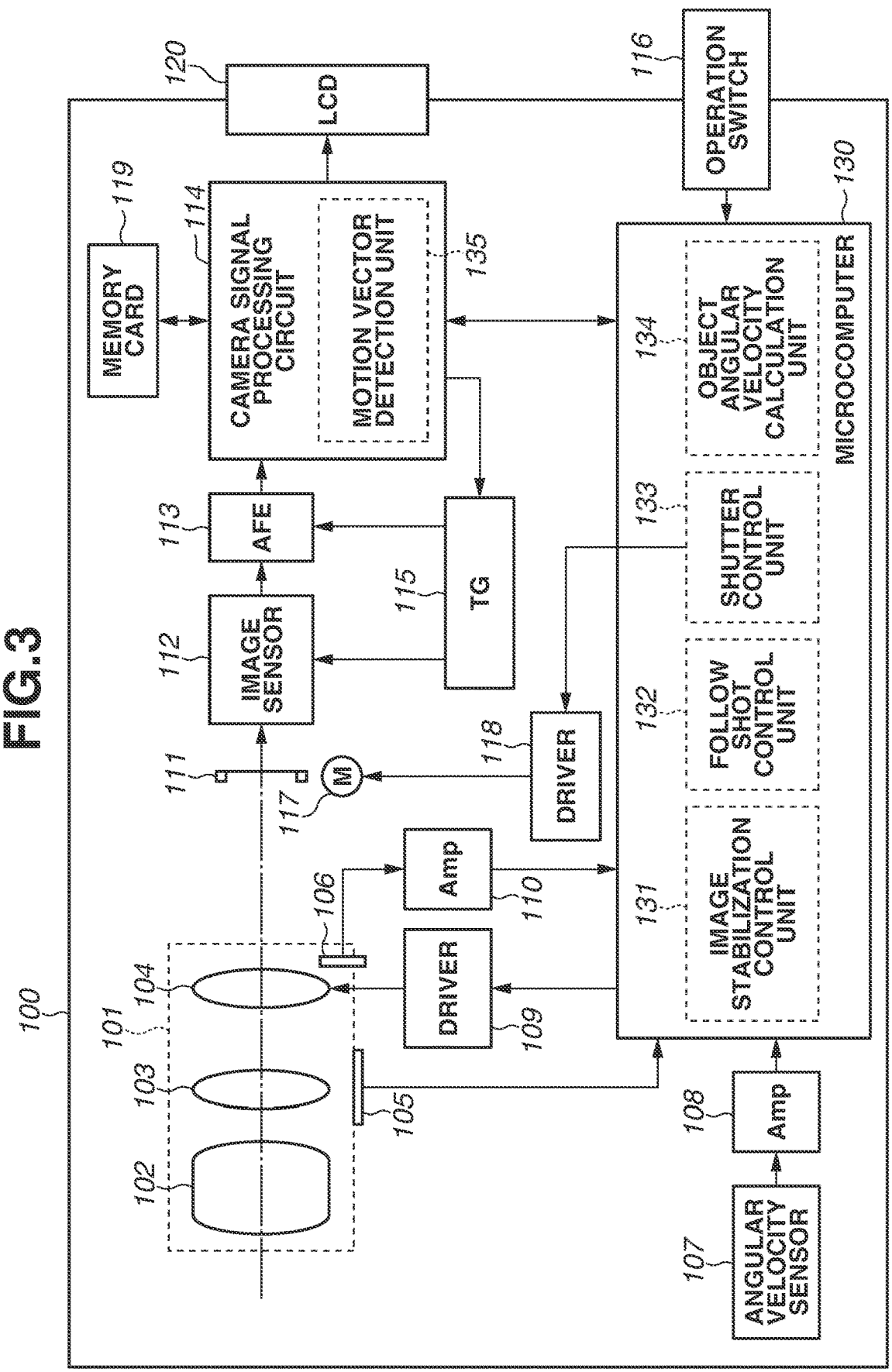
FIG. 3 is a diagram illustrating a configuration of a camera according to one or more aspects of the present disclosure.

FIG. 3 is a block diagram illustrating a configuration of a lens-integrated camera as an imaging apparatus according to a first exemplary embodiment of the present disclosure. A camera 100 includes an imaging lens unit 101 that is an imaging optical system focusing light from an object. The imaging lens unit 101 includes a main lens 102, a zoom lens 103 that can change a focal length, and an unillustrated focus lens that performs focus adjustment. Further, the imaging lens unit 101 includes a shift lens 104 that moves in a direction orthogonal to an optical axis to optically correct blur of an object image. In the follow shot imaging in which a user images a moving object while changing a direction of the camera 100 through panning, the shift lens 104 is movable (shiftable) in the direction orthogonal to the optical axis to assist the follow shot for reduction of blur of the object image. The main lens, the zoom lens, the focus lens, and the shift lens included in the imaging lens unit 101 each include one or more lenses. Further, the camera 100 includes a zoom encoder 105 that detects a position of the zoom lens 103, a position sensor 106 that detects a position of the shift lens 104, and an angular velocity sensor 107 that detects movement of the imaging apparatus, such as a gyro sensor. Further, the camera 100 includes an amplifier 108 that amplifies an output of the angular velocity sensor 107, a microcomputer 130 for camera control, a driver 109 that drives the shift lens 104, and an amplifier 110 that amplifies an output of the position sensor 106.

The camera 100 further includes a shutter 111, an image sensor 112, an analog signal processing circuit 113, a camera signal processing circuit 114, a timing generator 115, an operation switch 116, a shutter driving motor 117, and a driver 118.

The image sensor 112 includes a photoelectric conversion device such as a complementary metal-oxide semiconductor (CMOS) sensor or a charge-coupled device (CCD) sensor, and photoelectrically converts the object image formed by the imaging lens unit 101 to output an analog electric signal. The shutter 111 controls an exposure time of the image sensor 112.

The analog signal processing circuit (analog front end (AFE)) 113 amplifies the analog signal output from the image sensor 112, further converts the amplified analog signal into a digital imaging signal, and provides the imaging signal to the camera signal processing circuit 114.

The camera signal processing circuit 114 performs various kinds of image processing on the imaging signal to generate an image signal (picked-up image). The picked-up image (or still image taken out therefrom) is recorded in a memory card 119 that is detachable from the camera 100, or is displayed on a monitor (hereinafter, liquid crystal display (LCD)) 120 that includes a display device such as a liquid crystal panel. Moreover, the camera signal processing circuit 114 includes a motion vector detection unit 135 that detects a motion vector between frame images configuring the image signal.

The timing generator 115 sets operation timing of the image sensor 112 and the analog signal processing circuit 113. The operation switch 116 includes various kinds of switches such as a power switch, a release switch, and a mode selection switch, and a dial. In the camera 100 according to the present exemplary embodiment, a follow shot assisting mode and a normal imaging mode are switchable through operation of the mode selection switch. The shutter driving motor 117 is driven by the driver 118 to charge the shutter 111.

Further, the microcomputer 130 includes an image stabilization control unit 131, a follow shot control unit 132, a shutter control unit 133, and an object angular velocity calculation unit 134.

The image stabilization control unit 131 performs camera-shake correction control (image stabilization control) in which driving of the shift lens 104 is controlled in order to correct (reduce) blur of the object image caused by camera shake.

The follow shot control unit 132 controls the shift driving of the shift lens 104 to assist the follow shot.

The shutter control unit 133 releases energization of an unillustrated release electromagnetic magnet through the driver 118 to open the shutter 111 in a charged state, and controls the shutter driving motor 117 to perform charging operation of the shutter 111.

The object angular velocity calculation unit 134 calculates relative object angular velocity of the object to be imaged, to the camera 100. In addition, the microcomputer 130 performs, for example, focus lens control and diaphragm control.

For the camera-shake correction, detection and correction are performed in terms of two orthogonal axes such as a horizontal direction and a vertical direction; however, only one axis is described in the present exemplary embodiment because of the same configuration in the two axes.

When the power switch of the operation switch 116 is operated and the camera 100 turned on, the microcomputer 130 detects the status change, and power supply and initial setting to each of the circuits in the camera 100 are performed.

In the normal imaging mode in which the follow shot assisting mode is not set, the angular velocity sensor 107 detects shake of the camera 100 due to hand shake, and the image stabilization control unit 131 uses a result of the detection and drives the shift lens 104 to perform camera-shake correction.

Figure 4:
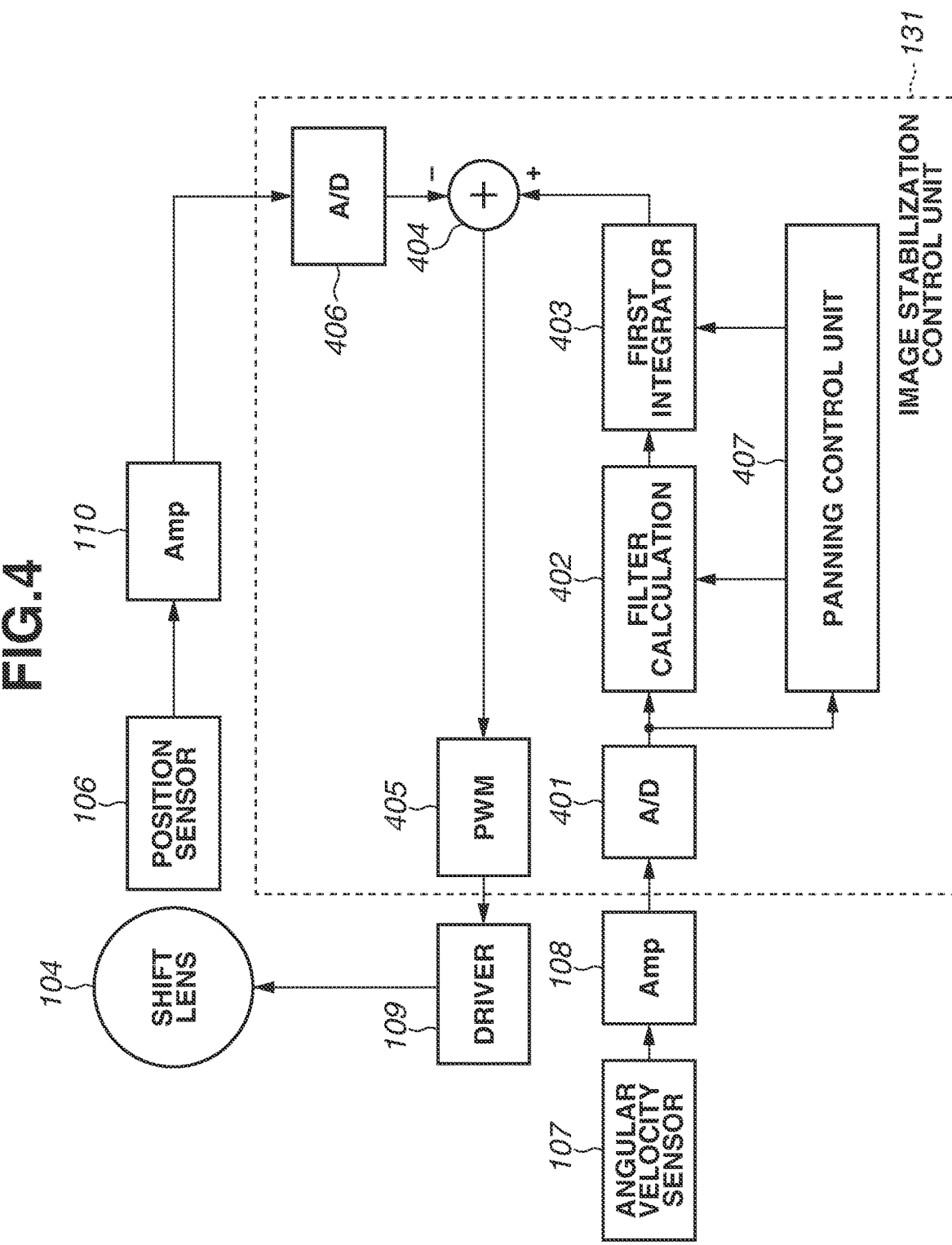
FIG. 4 is a diagram illustrating a configuration of an image stabilization system according to one or more aspects of the present disclosure.

A camera-shake correction function is now described. FIG. 4 is a diagram illustrating a configuration of the image stabilization system according to the present exemplary embodiment. Components similar to the components in FIG. 3 are denoted by the same reference numerals, and description of the components is omitted. In FIG. 4, reference numerals 401 to 407 illustrate detailed components of the image stabilization control unit 131. An analog-to-digital (A/D) converter 401 converts an analog signal as an angular velocity signal output from the angular velocity sensor 107 (amplifier 108), into a digital signal as angular velocity data. Output data sampling of the angular velocity sensor 107 is performed with a frequency of about 1 kHz to about 10 kHz.

A filter calculation unit 402 includes, for example, a high-pass filter (HPF), and reduces an offset component included in the angular velocity data and changes a cutoff frequency of the HPF. A first integrator 403 converts the angular velocity data into angular displacement data in order to generate driving target data of the shift lens 104. An A/D converter 406 converts an analog signal as a position signal of the position sensor 106, into a digital signal as position data. A first adder 404 subtracts a current shift lens position from the driving target value of the shift lens 104 to calculate a driving amount data of the shift lens 104. A pulse-width modulation (PWM) output unit 405 provides the calculated driving amount data to the shift lens driving driver 109.

A panning control unit 407 determines whether the camera 100 has been panned, from the angular velocity data. Further, in a case where it is determined as panning, the panning control unit 407 performs cutoff frequency change control of the filter calculation unit 402 and adjustment of an output of the first integrator 403.

Figure 5:
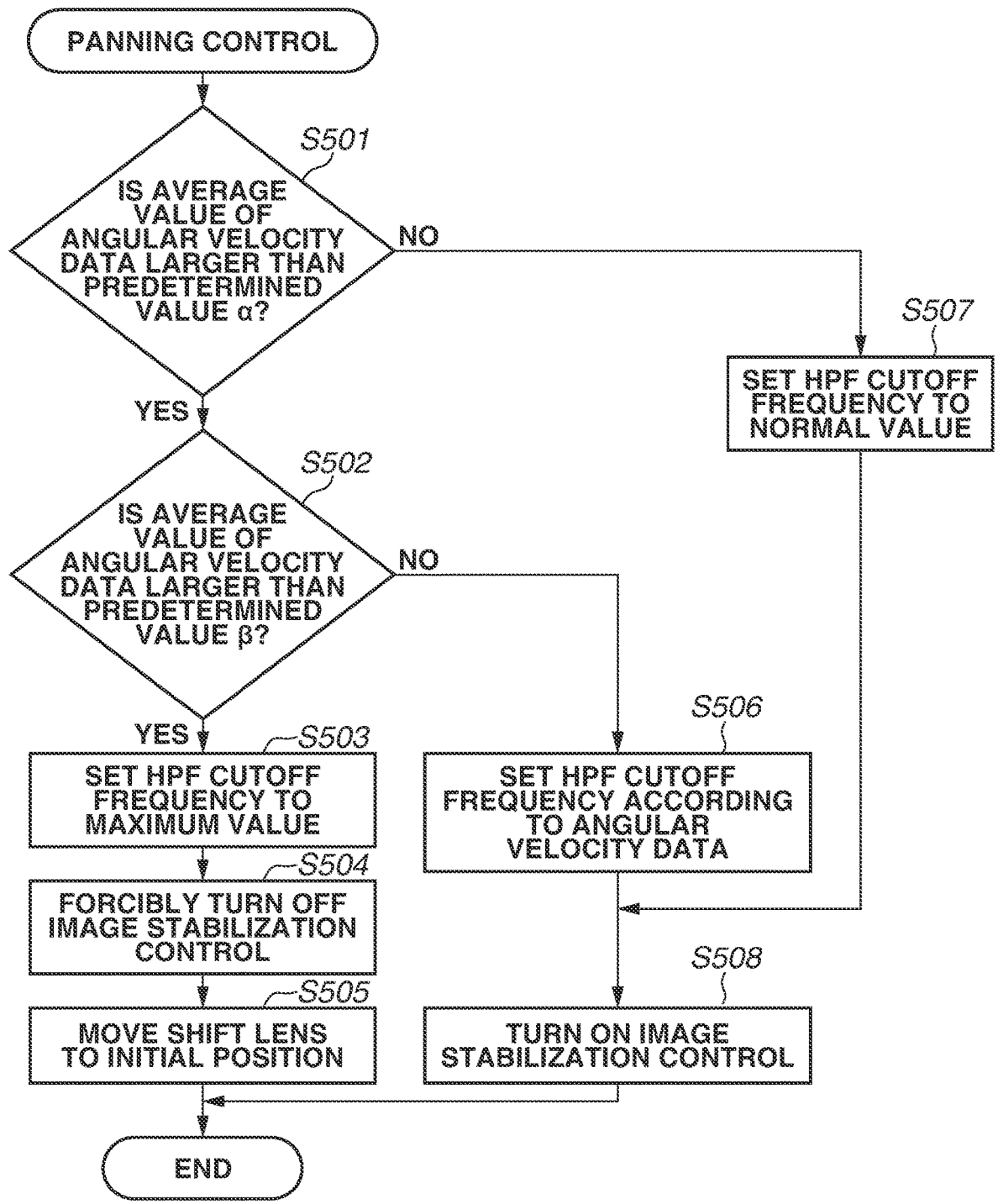
FIG. 5 is a diagram illustrating panning control according to one or more aspects of the present disclosure.

FIG. 5 is a diagram illustrating an example of a flowchart of the panning control performed by the panning control unit 407.

In step S501, the panning control unit 407 determines whether an average value (average value by predetermined number of times of sampling, hereinafter, referred to as angular velocity average value) of the angular velocity data taken from the A/D converter 401 is larger than a predetermined value α. In a case where the angular velocity average value is equal to or lower than the predetermined value α (NO in step S501), the panning control unit 407 determines that the panning is not performed, and the processing proceeds to step S507. In contrast, in a case where the angular velocity average value is larger than the predetermined value α (YES in step S501), the processing proceeds to step S502 and the panning control unit 407 determines whether the angular velocity average value is larger than a predetermined value β. In a case where the angular velocity average value is equal to or lower than the predetermined value β (No in step S502), the panning control unit 407 determines that slow panning (at low speed) is performed, and the processing proceeds to step S506. In a case where the angular velocity average value is larger than the predetermined β (YES in step S502), the panning control unit 407 determines that drastic panning (at high speed) is performed, and the processing proceeds to step S503.

The panning control unit 407 sets the cutoff frequency of the HPF in the filter calculation unit 402 to a maximum value in step S503, and forcibly turns off the camera-shake correction control (in non-execution state) in step S504. The reason why the image stabilization control is turned off in the high-speed panning is because, if the high-speed panning is handled as large camera shake and the shift lens 104 is shifted, the picked-up image is largely moved at a time when the shift lens 104 reaches a shift end, which gives unpleasant sensation to a photographer. In addition, this because, in the case where the high-speed panning is performed, the movement of the picked-up image by the panning is, large, and appearance of the image blur caused by camera shake hardly gives unpleasant sensation to the photographer. Moreover, the shift lens 104 is gradually stopped in next step after the cutoff frequency of the HPF is set to the maximum value, which makes it possible to avoid giving unpleasant sensation to the photographer due to appearance of image blur caused by camera shake according to the turning-off of the image stabilization control.

Thereafter, in step S505, the panning control unit 407 gradually changes the output of the first integrator 403 from the current data to data at an initial position, which gradually returns the shift lens 104 to the initial position. This is because the shift lens 104 is desirably placed at the initial position within the driving range at a time when camera-shake correction operation is restarted.

In step S506, the panning control unit 407 sets the cutoff frequency of the HPF according to the size of the angular velocity data value. This is because image blur caused by camera shake is conspicuous in the low-speed panning, and therefore it is necessary to correct the image blur. The cutoff frequency is set such that the image blur caused by camera shake is corrected while followability of the picked-up image to the panning is maintained at a degree not causing unnaturalness.

In step S507, the panning control unit 407 sets the cutoff frequency of the HPF to a value in normal times.

In step S508, the panning control unit 407 releases the forcible off setting of the image stabilization control (turns on image stabilization control).

Figure 7:
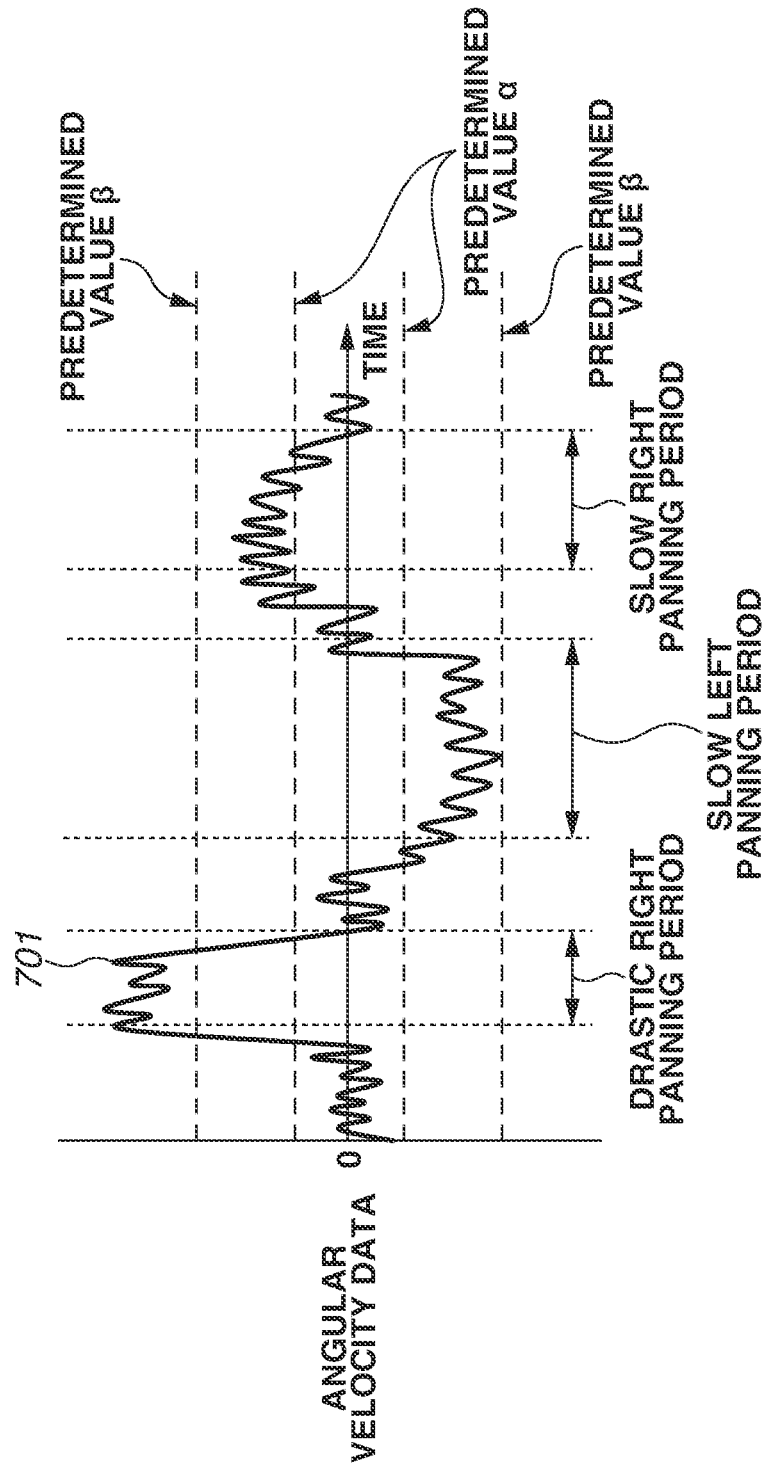
FIG. 7 is a diagram illustrating an angular velocity data in panning.

FIG. 7 is a diagram illustrating a relationship between the angular velocity data in the horizontal direction in the panning and both of the predetermined values α and β. A reference numeral 701 in FIG. 7 denotes sampled angular velocity data. In this example, the angular velocity data in a plus direction is obtained in a case where the camera 100 is panned rightward, and the angular velocity data in a minus direction is obtained in a case where the camera 100 is panned leftward. In the example of FIG. 7, drastic (high-speed) right panning and slow (low-speed) right and left panning are detected.

As illustrated in FIG. 7, the angular velocity data is largely deviated from an initial value (zero in this case) in the panning. Therefore, in a case where the angular velocity data is integrated to calculate the target position data of the shift lens 104, the output of the first integrator 403 becomes an extremely-large value due to a direct-current (DC) offset component, which results in an uncontrollable state. Accordingly, in the case where the panning is detected, it is necessary to increase the cutoff frequency of the HPF to cut the DC component. This is particularly remarkable in the case of the drastic panning, and therefore the cutoff frequency is further increased to prevent the output of the first integrator 403 from being increased. In the case of the drastic panning, the movement of the image by the panning becomes extremely large with respect to the camera shake. Therefore, even if the camera-shake correction function is turned off in the panning direction, unpleasant sensation does not particularly occur.

The panning control is performed in the above-described manner, which makes it possible to obtain the image without pleasant sensation in the panning.

In FIG. 3, when the follow shot assisting mode is set through the operation switch 116, the motion vector detection unit 135 of the camera signal processing circuit 114 detects a motion vector of the object from the picked-up image. The detected motion vector is provided for the follow shot control unit 132. Further, at the same time, the follow shot control unit 132 receives the angular velocity data from the angular velocity sensor 107 (amplifier 108).

When the photographer performs the follow shot, the motion vector of the object output from the motion vector detection unit 135 includes two kinds of vectors, a vector corresponding to a main object to be picked-up by the photographer and a vector corresponding to a flowing background. At this time, out of the two kinds of detected motion vectors, data with a small moving amount becomes the motion vector of the main object, and a value of the motion vector represents a moving amount of the main object on an image plane because this is intended for the follow shot.

In contrast, the angular velocity data corresponds to the panning speed (follow shot speed) of the camera 100. Therefore, a difference between the angular velocity data and the angular velocity that is calculated from the moving amount of the main object on the image plane and the current focal distance of the lens, is calculated, to obtain the angular velocity of the main object to the camera 100. The object angular velocity calculation unit 134 calculates the angular velocity of the main object to the camera 100 (also referred to as relative object angular velocity) at every timing when the monitor image is processed. Further, the object angular velocity calculation unit 134 transmits, to the follow shot control unit 132, set information about the calculated relative object angular velocity and the calculated calculation time (acquisition time).

Figure 6:
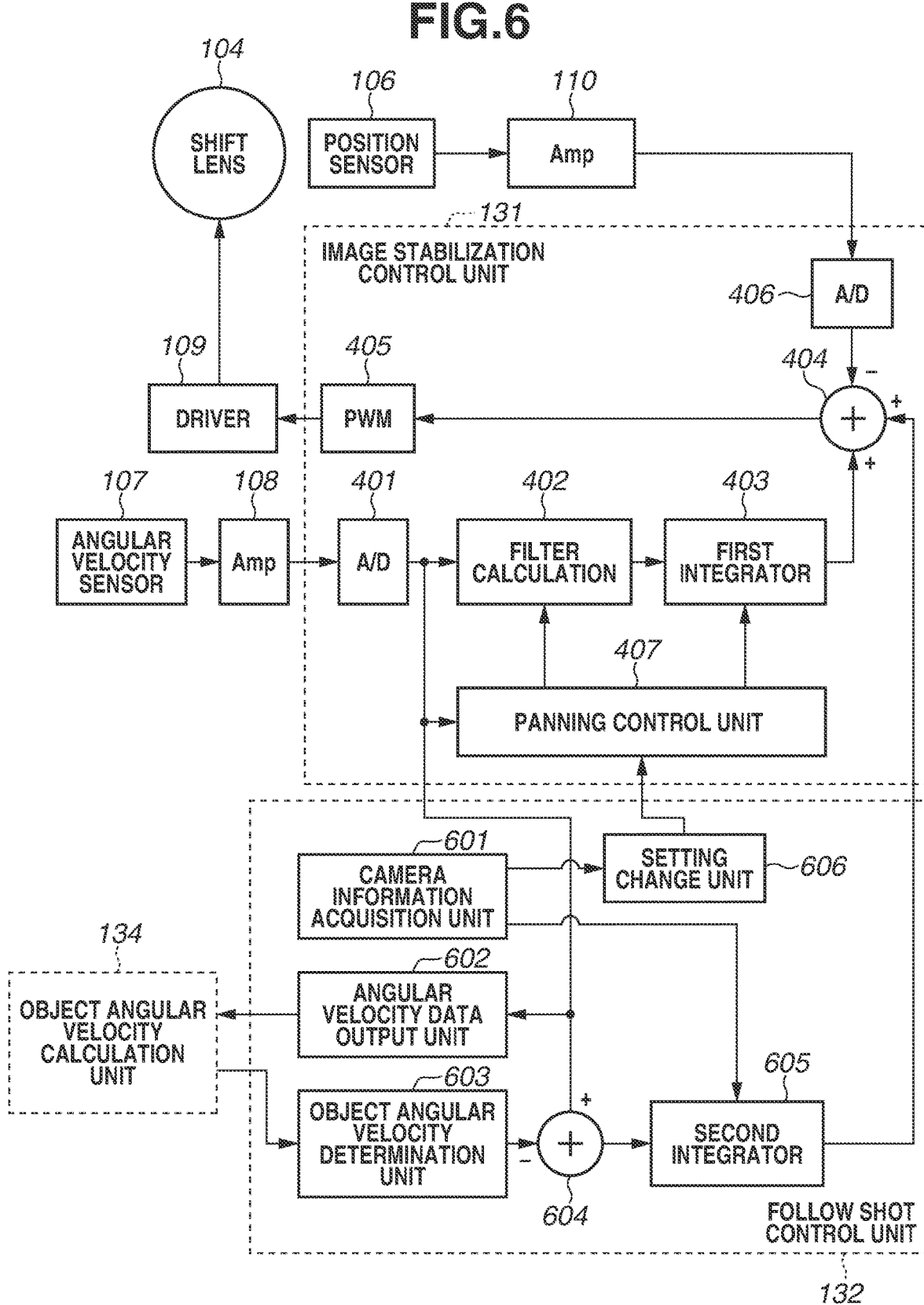
FIG. 6 is a diagram illustrating a configuration of a driving control system of a shift lens in the follow shot assisting mode according to one or more aspects of the present disclosure.

FIG. 6 is a diagram illustrating a configuration of a driving control system of the shift lens 104 in the follow shot assisting mode, and components similar to those in FIG. 3 and FIG. 4 are denoted by the same reference numerals. A camera information acquisition unit 601 acquires follow shot setting information indicating that the follow shot assisting mode has been set through operation of the mode selection switch of the operation switch 116, and release information indicating that the imaging has been instructed through operation of the release switch. An angular velocity data output unit 602 samples the angular velocity data at predetermined timing and provides the sampled angular velocity data for the object angular velocity calculation unit 134.

An object angular velocity determination unit 603 acquires the set information about the relative object angular velocity and the calculation time thereof that have been calculated by the object angular velocity calculation unit 134 before imaging for recording (before exposure of image sensor 12 for still image recording), and holds (accumulates) the set information as an angular velocity history. In the following description, exposure indicates imaging for recording. Further, the object angular velocity determination unit 603 determines the relative object angular velocity that is predicted angular velocity (predicted information) of the object to the camera 100 during the exposure period (in imaging), through, for example, calculation with use of the angular velocity history before the exposure (before exposure period). As a result, the object angular velocity determination unit 603 determines the acquired relative object angular velocity during the exposure period, as the relative object angular velocity to be used in control of the shift driving of the shift lens 104 during the exposure period in the follow shot assisting.

A second adder 604 calculates a difference between the angular velocity data from the angular velocity sensor 107 and the relative object angular velocity during the exposure period that has been determined by the object angular velocity determination unit 603. A second integrator 605 performs integration operation only during the exposure period. A setting change unit 606 changes setting of the panning control unit 407, according to notification of the setting information about the follow shot assisting mode from the camera information acquisition unit 601.

When the follow shot assisting mode is set through operation of the operation switch 116, the camera information acquisition unit 601 notifies the setting change unit 606 of the follow shot setting information. The setting change unit 606 performs the setting change of the panning control unit 407, according to the notified follow shot setting information. The setting change performed at this time is to facilitate transition to the drastic panning state. More specifically, the above-described predetermined values β and α for panning determination are changed.

In addition, the second adder 604 calculates a difference between the angular velocity data from the angular velocity sensor 107 and the relative object angular velocity from the object angular velocity determination unit 603, and transmits a result of the calculation to the second integrator 605.

The second integrator 605 starts the above-described integration operation of the differences during the exposure period, according to the release information from the camera information acquisition unit 601. The second integrator 605 outputs a value at which the position of the shift lens 104 becomes the initial position (center) during a period other than the exposure period. In a case where the shift lens 104 is intended to be placed at the center position during the period other than the exposure period, the shift lens 104 suddenly moves from the current position to the center position at the end of the exposure period. A time period immediately after the exposure period, however, corresponds to a time period during which the image signal is read out from the image sensor 112. Thus, during the time period, display of the picked-up image is not performed on the LCD 120. Therefore, movement of the picked-up image due to sudden movement of the shift lens 104 causes no problem.

Further, the output of the second integrator 605 is added to the output of the first integrator 403 by the first adder 404, and the shift position data of the shift lens 104 provided from the position sensor 106 (shift position A/D converter 406) is subtracted from the added value. As a result, driving amount data of the shift lens 104 is calculated.

When the follow shot operation with high-speed panning is actually performed by the photographer in the follow shot assisting mode, the panning control unit 407 immediately starts the panning control and turns off the image stabilization control as described in step S504 in FIG. 5. In the panning control, the shift lens 104 is moved to correct a displacement amount of the object image on the image plane that corresponds to the difference between the angular velocity by the panning of the camera 100 and the relative object angular velocity as the angular velocity of the main object (hereinafter, simply referred to as object) to the camera 100. Accordingly, the difference between the panning speed of the camera 100 and the moving speed of the object during the exposure period that is a cause of follow shot failure, is canceled by the shift driving of the shift lens 104. As a result, the follow shot succeeds.

The object angular velocity determination unit 603 determines the relative object angular velocity during the exposure period with use of the angular velocity history that has been acquired from the object angular velocity calculation unit 134 and accumulated before the exposure, in consideration of the time of a release time lag and the exposure period. For example, in a case where the follow shot of an object performing uniform linear motion is performed by the camera 100 that is positioned in a direction orthogonal to a traveling direction of the object, the angular velocity of the object measured by the camera 100 is continuously varied. Therefore, the angular velocity of the object is not the same between at the time of being detected and during the exposure period. Therefore, it is necessary to consider the variation of the angular velocity, i.e., acceleration, in order to favorably perform the above-described correction by the shift driving of the shift lens 104.

Figure 8:
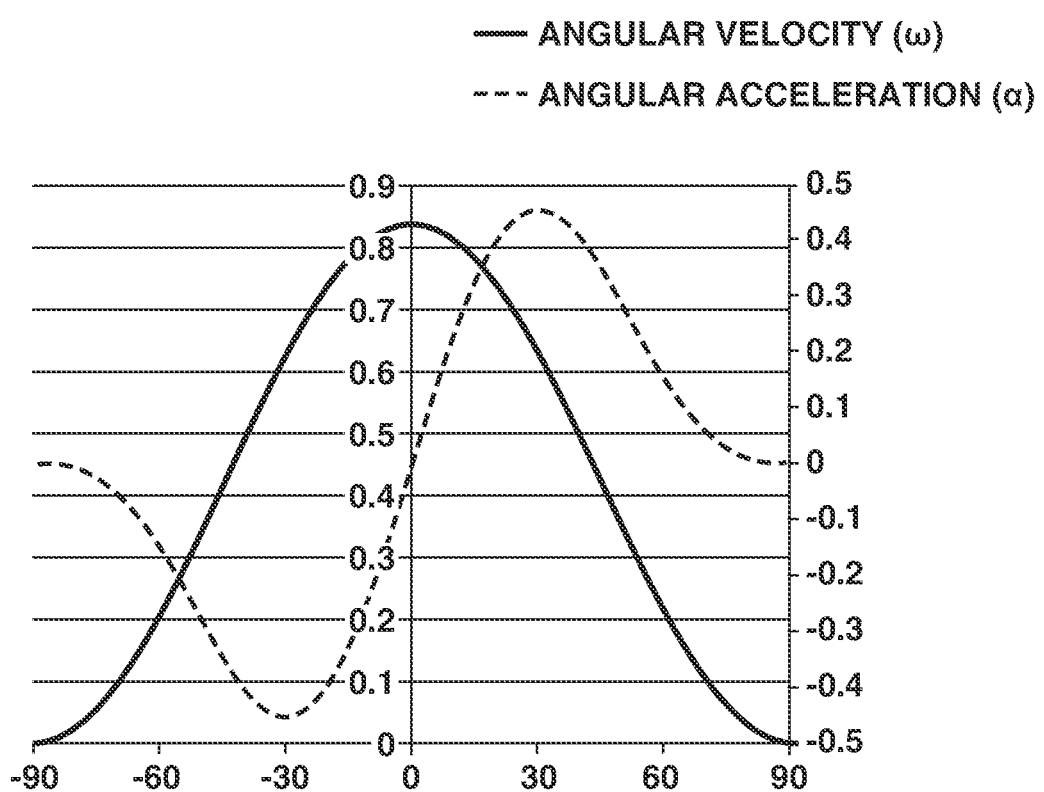
FIG. 8 is a diagram illustrating a relationship between relative angular velocity and angular acceleration of an object.
Figure 9:
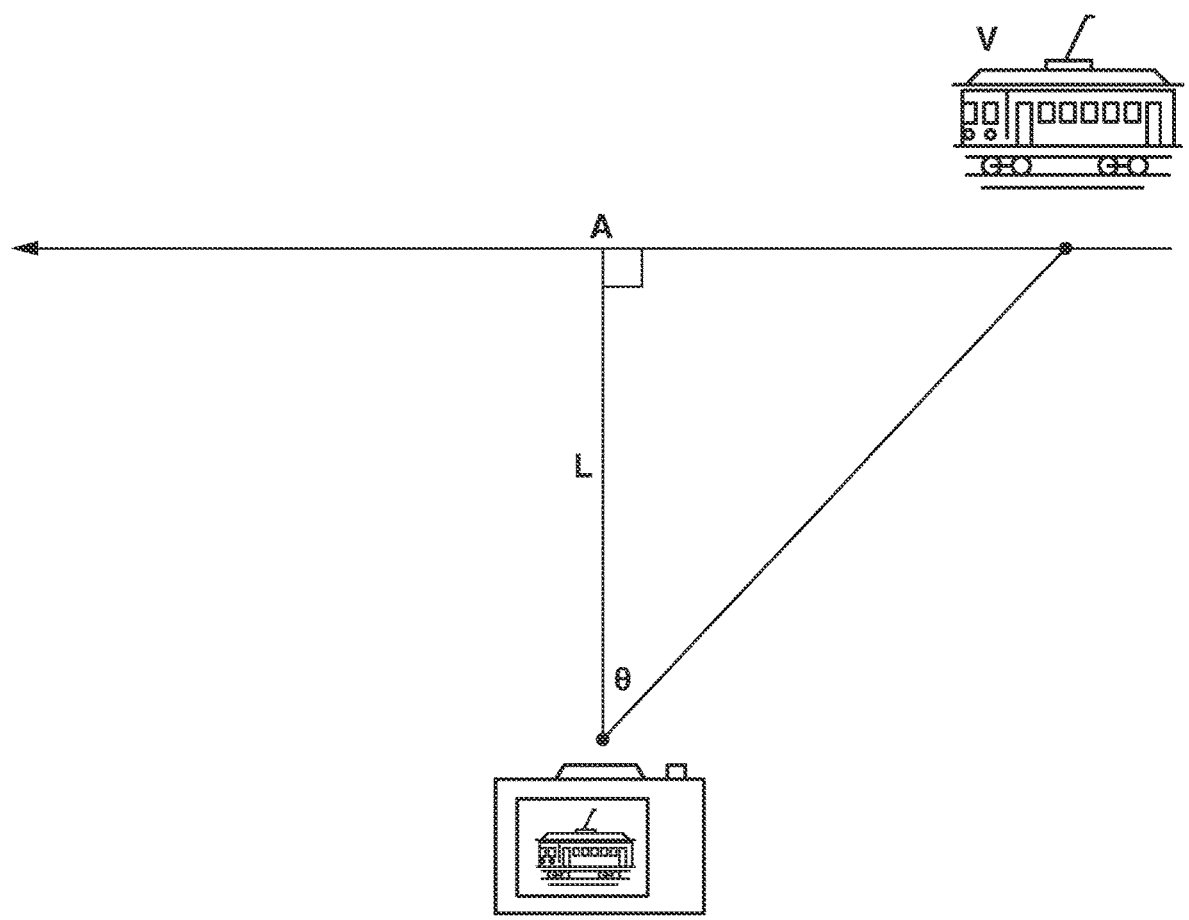
FIG. 9 is a diagram to explain the relative angular velocity of the object.

FIG. 8 is a diagram illustrating a relationship between the relative angular velocity and the angular acceleration of the object, and illustrates variation of the angular velocity when the angular velocity of the object (train) performing uniform linear motion is measured by the camera 100 that is positioned in a direction orthogonal to a traveling direction of the object, as illustrated in FIG. 9. In FIG. 9, the object performs the uniform linear motion at speed v from left to right. A point A is a position (hereinafter, referred to as origin) at which a distance from the camera 100 on a moving trajectory in the uniform linear motion of the object becomes the shortest. A length L is a distance from the camera 100 to the origin A (the shortest distance to moving trajectory). An angle θ is formed by the direction from the camera 100 to the origin A, i.e., the direction orthogonal to the traveling direction of the object and the direction from the camera 100 to the object (i.e., direction of camera 100; hereinafter, referred to as panning angle), and has a plus value on the right side of the origin A and has a minus value on the left side thereof.

A horizontal axis in FIG. 8 indicates the panning angle θ and a center vertical axis indicates the angular velocity of the object. When the object in FIG. 9 is positioned at the origin A, the panning angle θ becomes 0 degrees. A graph of a solid line indicates the variation of the angular velocity. Further, a right vertical axis indicates the angular acceleration, and a graph of a dashed line indicates the variation of the angular acceleration. The variation of the angular acceleration used herein is variation of the angular acceleration of the object corresponding to the position of the object based on the position of the camera. FIG. 8 illustrates the angular velocity and the angular acceleration in a case where the shortest distance from the camera 100 to the origin A is 20 m, and the object performs the uniform linear motion at speed of 60 km/h.

In FIG. 8, the angular velocity becomes the maximum and the angular acceleration becomes zero at a time when the object passes through the origin A (panning angle θ is 0 degrees). Further, the angular acceleration becomes the maximum when the panning angle θ is +30 degrees, and the angular acceleration becomes the minimum when the panning angle θ is −30 degrees. The relationship between the panning angle θ and both of the angular velocity and the angular acceleration is not depend on the shortest distance and the velocity of the object described above.

Figure 2:
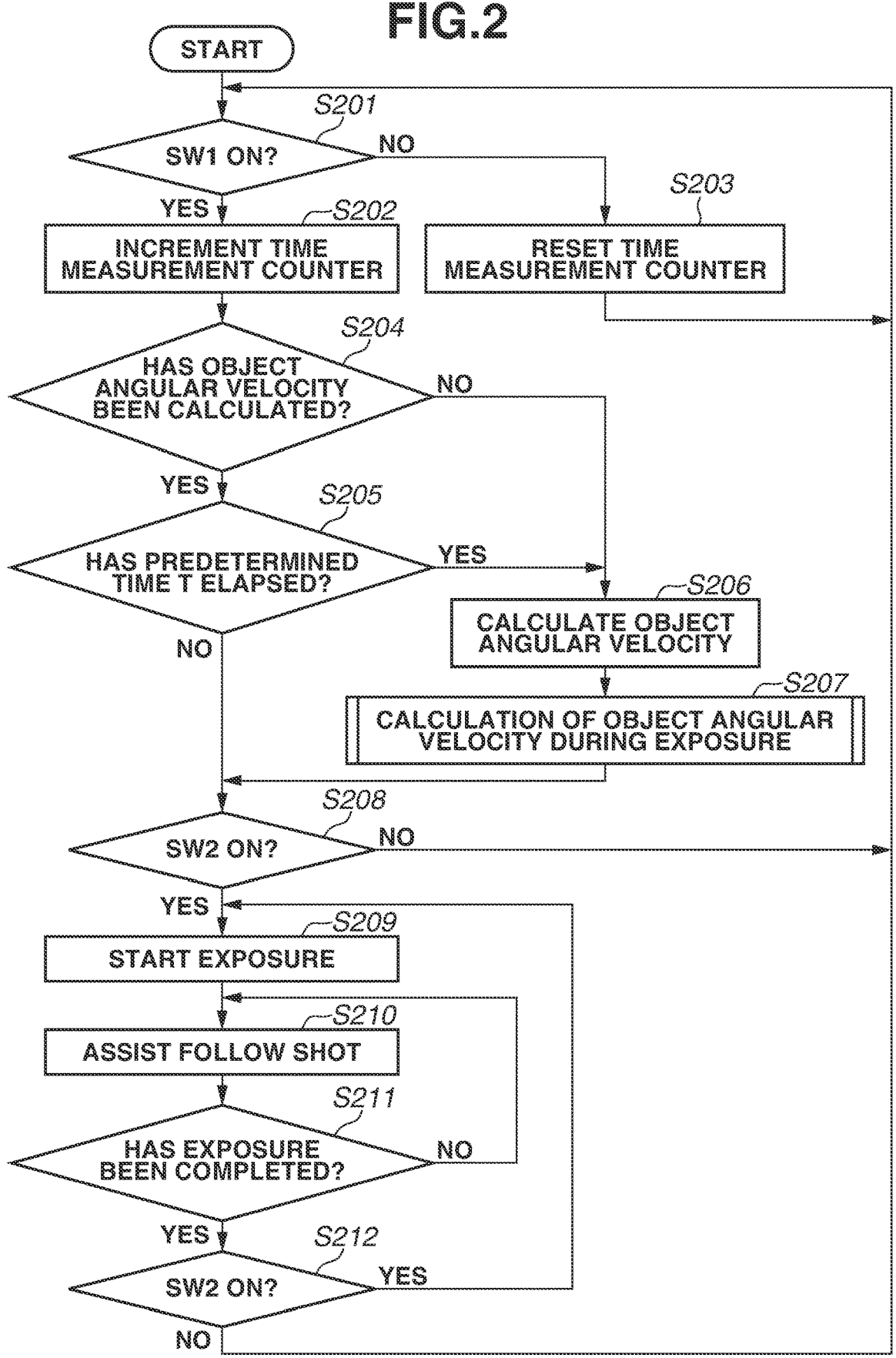
FIG. 2 is diagram illustrating imaging processing in a follow shot assisting mode according to one or more aspects of the present disclosure.

FIG. 2 is a diagram illustrating a flowchart of the imaging processing in the follow shot assisting mode. The processing is performed by the microcomputer 130 according to a follow shot assisting control program that is a computer program.

In step S201, the microcomputer 130 determines whether the release switch has been half-pressed (whether SW1 is ON). In a case where the release switch has been half-pressed (SW1 is ON; YES in step S201), the processing proceeds to step S202, and a time measurement counter is incremented. In a case where the release switch has not been half-pressed (SW1 is not ON; NO in step S201), the processing proceeds to step S203, and the time measurement counter is reset. The processing then returns to step S201.

In step S204, the microcomputer 130 confirms whether the relative object angular velocity (simply referred to as object angular velocity in FIG. 2) has been already calculated by the object angular velocity calculation unit 134. In a case where the relative object angular velocity has been already calculated (YES in step S204), the processing proceeds to step S205, and the microcomputer 130 confirms whether a time of the time measurement counter has reached a predetermined time T. In a case where the relative object angular velocity has not yet been calculated (NO in step S204) and in a case where the relative object angular velocity has been already calculated but the time of the time measurement counter has reached the predetermined time T (the exposure period is longer than the predetermined time T; YES in step S205), the processing proceeds to step S206.

In step S206, the microcomputer 130 causes the object angular velocity calculation unit 134 to calculate the relative object angular velocity. This causes the object angular velocity calculation unit 134 to calculate the relative object angular velocity and causes the object angular velocity determination unit 603 to acquire the angular velocity history, before the exposure that is started in response to full-press operation of the release switch, which will be described below. The reason why the relative object angular velocity is calculated again in the case where the time of the time measurement counter has reached the predetermined time T is to consider possibility of variation of the velocity of the object in the predetermined time T. The relative object angular velocity calculated by the object angular velocity calculation unit 134 is transmitted to the object angular velocity determination unit 603 at every calculation. In case where the time of the time measurement counter has not yet reached the predetermined time T in step S205 (NO in step S205), the processing proceeds to step S208.

In step S207 after step S206, the microcomputer 130 causes the object angular velocity determination unit 603 to determine the relative object angular velocity during the exposure period. The process will be described in detail below. The processing then proceeds to step S208.

In step 3208, the microcomputer 130 determines whether the release switch has been fully pressed (whether SW2 is ON). In a case where the release switch has not been fully pressed (SW2 is not ON; NO in step S208), the processing returns to step S201. In contrast, in a case where the release switch has been fully pressed (SW2 is ON; YES in step S208), the processing proceeds to step S209, and the microcomputer 130 opens the shutter 111 through the shutter control unit 133, thereby starting exposure.

Further, in step S210, the microcomputer 130 causes the follow shot control unit 132 to perform the driving control of the shift lens 104 according to the relative object angular velocity determined in step S207. As a result, the follow shot assisting to correct the displacement amount of the object image on the image plane is performed. At this time, in a case where the panning is determined as the high-speed panning in step S502 in FIG. 5, the microcomputer 130 drives the shift lens 104 through the image stabilization control unit 131 in order to correct image blur caused by camera shake.

Subsequently, in step S211, the microcomputer 130 determines whether the exposure has been completed. In a case where the exposure has been completed (YES in step S211), the processing proceeds to step S212. In a case where the exposure has not been completed (NO in step S211), the processing returns to step S210. In step S212, the microcomputer 130 determines whether the release switch has been fully pressed (whether SW2 is ON) again. In a case where the release switch has been fully pressed (SW2 is ON; YES in step S212), the processing returns to step S209, and next exposure (imaging of next frame in continuous imaging) is performed. In contrast, in a case where the release switch has not been fully pressed (SW2 is not ON; NO step S212), the processing returns to step S201.

Figure 1:
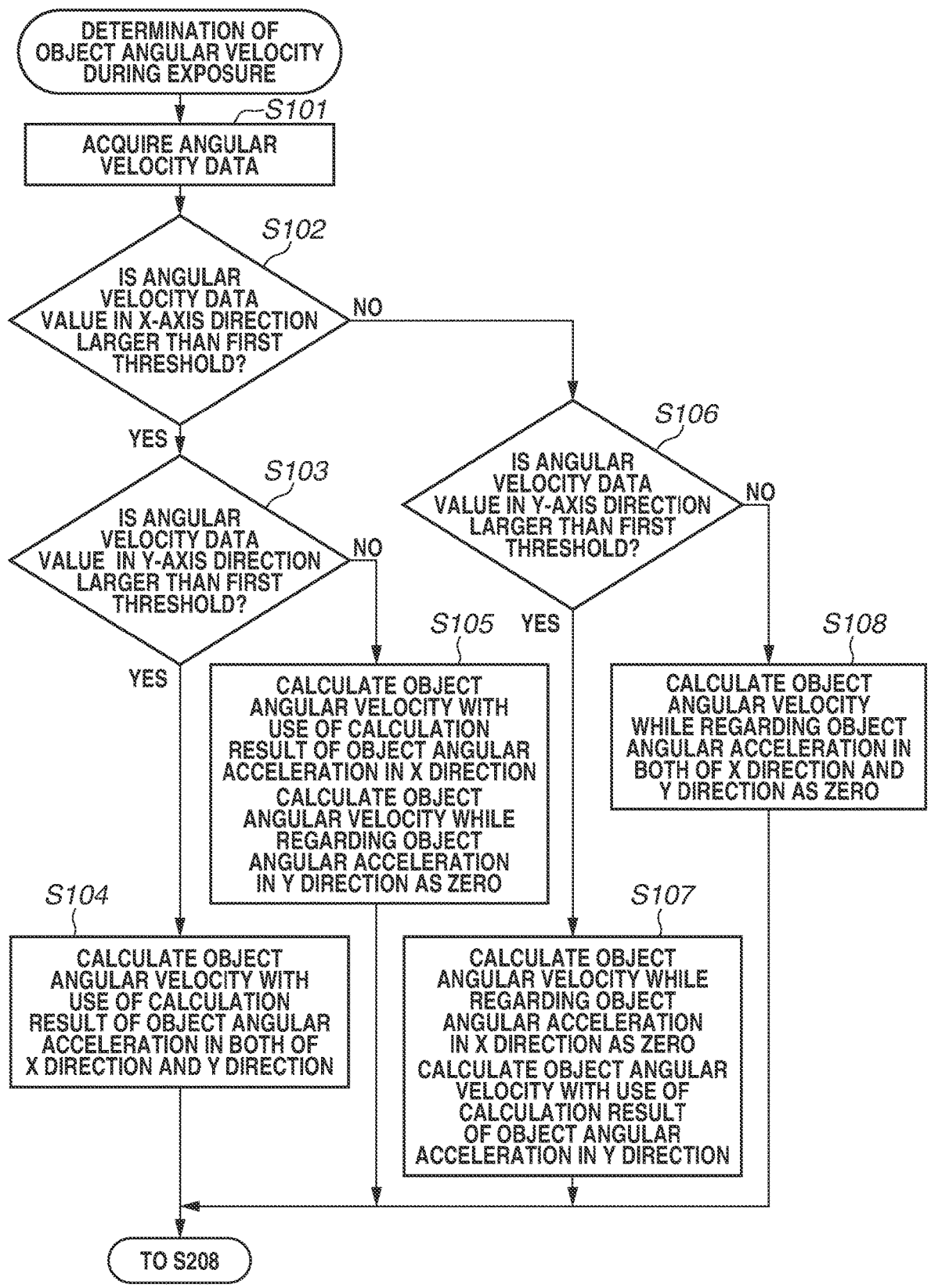
FIG. 1 is a diagram illustrating processing of determining object angular velocity during exposure according to one or more aspects of the present disclosure.

FIG. 1 is a diagram illustrating a flowchart of the processing of determining the object angular velocity during exposure that is performed by the object angular velocity determination unit 603 in step S207 in FIG. 2, The processing is performed by the object angular velocity determination unit 603 according to the follow shot assisting control program that is a computer program, and the processing is started when the object angular velocity determination unit 603 receives notification of the object angular velocity in step S206.

In step S101, the object angular velocity determination unit 603 acquires the latest angular velocity data, and the processing then proceeds to step S102. In step S102, the object angular velocity determination unit 603 performs threshold determination with respect to an X-axis direction (first direction) of the held latest angular velocity data. In the present exemplary embodiment, the X-axis direction indicates a direction orthogonal to a gravity direction, and as with in FIG. 7, the angular velocity data in the pleas direction is obtained in the case where the camera 100 is panned rightward, and the angular velocity data in the minus direction is obtained in the case where the camera 100 is panned leftward. A Y-axis direction described below indicates a direction parallel to the gravity direction, and the angular velocity data in the plus direction is obtained in a case where the camera 100 is panned upward, and the angular velocity data in the minus direction is obtained in a case where the camera 100 is panned downward. In a case where an absolute value of the angular velocity data in the X-axis direction is larger than a first threshold (e.g., 6 dps)

(YES in step S102), the processing proceeds to step S103. In a case where the absolute value of the angular velocity data in the X-axis direction is equal to or lower than the first threshold (NO in step S102), the processing proceeds to step S106.

In step S103, the object angular velocity determination unit 603 performs threshold determination with respect to the Y-axis direction (second direction orthogonal to first direction) of the latest angular velocity data. In a case where an absolute value of the angular velocity data in the Y-axis direction is larger than the first threshold (e.g., 6 dps) (YES in step S103), the processing proceeds to step S104. In a case where the absolute value of the angular velocity data in the Y-axis direction is equal to or lower than the first threshold (NO in step S103), the processing proceeds to step S105.

In step S104, the object angular velocity determination unit 603 calculates, for each of the X-axis direction and the Y-axis direction, the object angular acceleration during exposure, based on a plurality of held past relative object angular velocities. Further, the object angular velocity determination unit 603 calculates the angular velocity difference during exposure from the release time lag and the calculated object angular acceleration, and adds the angular velocity difference to the relative object angular velocity calculated in step S206, thereby predicting the relative object angular velocity during exposure. A result of the prediction is determined as the relative object angular velocity during exposure, and the processing of determining the angular velocity then ends.

In step S105, the object angular velocity determination unit 603 determines, for the Y-axis direction, the relative object angular velocity calculated in step S206, as the relative object angular velocity during exposure. In contrast, the object angular velocity determination unit 603 calculates, for the X-axis direction, the object angular acceleration during exposure, based on the plurality of held past relative object angular velocities. Further, the object angular velocity determination unit 603 calculates the angular velocity difference during exposure from the release time lag and the calculated object angular acceleration, and adds the angular velocity difference to the relative object angular velocity calculated in step S206, thereby predicting the relative object angular velocity during exposure. A result of the prediction is determined as the relative object angular velocity during exposure, and the processing of determining the angular velocity then ends.

In step S106, the object angular velocity determination unit 603 performs threshold determination with respect to the Y-axis direction of the latest angular velocity data. In the case where the absolute value of the angular velocity data in the Y-axis direction is larger than the first threshold (e.g., 6 dps) (YES in step S106), the processing proceeds to step S107. In the case where the absolute value of the angular velocity data in the Y-axis direction is equal to or lower than the first threshold (NO in step S106), the processing proceeds to step S108.

In step S107, the object angular velocity determination unit 603 determines, for the X-axis direction, the relative object angular velocity calculated in step S206, as the relative object angular velocity during exposure. In contrast, the object angular velocity determination unit 603 calculates, for the Y-axis direction, the object angular acceleration during exposure, based on the plurality of held past relative object angular velocities. Further, the object angular velocity determination unit 603 calculates the angular velocity difference during exposure from the release time lag and the calculated object angular acceleration, and adds the angular velocity difference to the relative object angular velocity calculated in step S206, thereby predicting the relative object angular velocity during exposure. A result of the prediction is determined as the relative object angular velocity during exposure, and the processing of determining the angular velocity then ends.

In step S108, the object angular velocity determination unit 603 determines, for each of the X-axis direction and the Y-axis direction, the relative object angular velocity calculated in step S206, as the relative object angular velocity during exposure.

As described above, when the absolute value of the angular velocity data of the camera 100 is larger than the threshold, the angular acceleration is calculated based on the previous relative object angular velocity, and variation of the relative object angular velocity until exposure is predicted with use of the calculation result of the angular acceleration. In other words, the variation of the relative object angular velocity until exposure predicted based on the previous relative object angular velocity, to predict the relative object angular velocity during exposure. In contrast, when the absolute value of the angular velocity data of the camera 100 is equal to or lower than the threshold, the variation of the relative object angular velocity until exposure is not predicted based on the previous relative object angular velocity. In other words, the angular acceleration is not calculated based on the previous relative object angular velocity, and the relative object angular velocity during exposure is determined without reflecting a result of the calculation. This is because, when the variation of the relative object angular velocity is predicted in the case where the absolute value of the angular velocity data of the camera 100 is equal to or lower than the threshold, the variation of the relative object angular velocity is not predicted with high accuracy in some cases due to the error of the moving amount of the object on the image plane detected from the temporally-continuous images.

Accordingly, the above-described control makes it possible to suppress influence of the error of the moving amount of the object on the image plane detected from the temporally-continuous images and to perform camera shake correction.

In the present exemplary embodiment, the first threshold is 6 dps as an example; however, the threshold may be appropriately set in consideration of the influence of the error of the moving amount of the object on the image plane detected from the temporally-continuous images.

A second exemplary embodiment will be described. In the first exemplary embodiment, the variation of the relative object angular velocity until exposure is predicted based on the angular acceleration when the absolute value of the angular velocity data of the camera 100 is larger than the threshold, and the variation of the relative object angular velocity until exposure is not predicted when the absolute value of the angular velocity data of the camera 100 is not larger than the threshold. In contrast, in the second exemplary embodiment, a method of predicting the variation of the relative object angular velocity is changed in a stepwise manner according to the absolute value of the angular velocity data of the camera 100. This makes it possible to perform more favorable image blur correction according to the movement of the camera 100. More specifically, in the case were the variation of the relative object angular velocity until exposure is not predicted based on the previous relative object angular velocity in the first exemplary embodiment (steps S105, S107, and S108 in FIG. 1), comparison of the threshold and the angular velocity data (processing illustrated in FIG. 10) is further performed.

Figure 10:
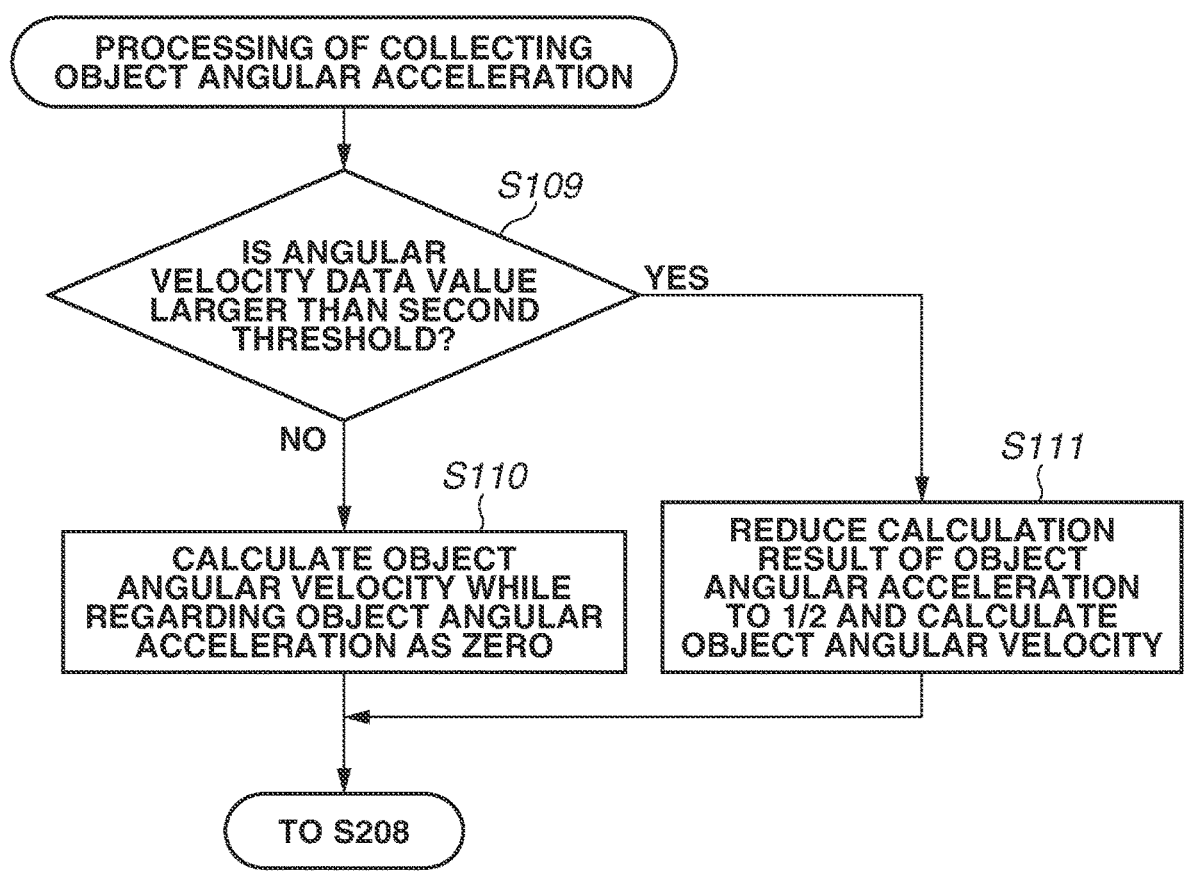
FIG. 10 is a diagram illustrating processing of correcting object angular acceleration according to one or more aspects of the present disclosure.

FIG. 10 is a diagram illustrating a flowchart of processing of correcting the object angular acceleration that is performed in steps S105, S107, and S108 in FIG. 1. The configuration of the imaging apparatus and the processing other than the processing illustrated in FIG. 10 according to the present exemplary embodiment are similar to those in the first exemplary embodiment, and detailed description thereof is accordingly omitted.

In a case where the processing proceeds to step S105, S107, or S108 according to the flowchart in FIG. 1, the object angular velocity determination unit 603 performs a process in step S109 for, as a target, the angular velocity data, the absolution value of which is not larger than the first threshold, out of the angular velocity data in the X-axis direction and the Y-axis direction.

In step S109, the object angular velocity determination unit 603 determines whether the absolute value of the target angular velocity data is larger than a second threshold (smaller than first threshold, e.g., 3 dps). In a case where the absolute value of the target angular velocity data is not larger than the second threshold (NO in step S109), the processing proceeds to step S110. In a case where the absolute value of the target angular velocity data is larger than the second threshold (YES in step S109), the processing proceeds to step S111. As for the direction, the angular velocity data of which is not a target, the object angular acceleration during exposure is calculated based on the plurality of held past relative object angular velocities. Further, the object angular velocity determination unit 603 calculates the angular velocity difference during exposure from the release time lag and the calculated object angular acceleration, and adds the angular velocity difference to the relative object angular velocity calculated in step S206, thereby predicting the relative object angular velocity during exposure. A result of the prediction is determined as the relative object angular velocity during exposure.

In step S110, as for the direction, the angular velocity data of which is a target, the object angular velocity determination unit 603 determines the relative object angular velocity calculated in step S206, as the relative object angular velocity during exposure. More specifically, the object angular velocity determination unit 603 regards the object angular acceleration until exposure as zero, and determines the relative object angular velocity during exposure without reflecting the calculation result of the angular acceleration.

In step S111, as for the direction, the angular velocity data of which is a target, the object angular velocity determination 603 calculates the object angular acceleration during exposure, based on the plurality of held past relative object angular velocities. Further, the object angular velocity determination unit 603 calculates the angular velocity difference during exposure from the release time lag and the object angular acceleration that is ½ of the calculated object angular acceleration, and adds the angular velocity difference to the relative object angular velocity calculated in step S206, thereby predicting the relative object angular velocity during exposure. A result of the prediction is determined as the relative object angular velocity during exposure.

As described above, in the present exemplary embodiment, the degree of the object angular acceleration until exposure that is reflected when the relative object angular velocity during exposure is determined is decreased in a stepwise manner as the angular velocity data value is decreased. As a result, it is possible to reduce difference of the relative object angular velocity during exposure between the case where the angular velocity data value is larger than the threshold and the case where the angular velocity data value is lower than the threshold, which makes it possible to perform more favorable image blur correction according to the movement of the camera 100 as compared with the first exemplary embodiment.

Although the first threshold is 6 dps as an example and the second threshold is 3 dps as an example in the present exemplary embodiment, the thresholds are not limited as long as the first threshold is smaller than the second threshold. Further, the first threshold in the present exemplary embodiment is set to the value similar to that in the first exemplary embodiment; however, the first threshold may be set to a value, e.g., 12 dps, larger than that of the first exemplary embodiment in order to perform stepwise control.

Moreover, in the case where the angular velocity data has a value between the first threshold and the second threshold, the object angular acceleration that is ½ of the object angular acceleration calculated based on the past relative object angular velocity is used. The ratio of the object angular acceleration to be reflected, however, is not limited to ½, and may be any ratio smaller than one.

Furthermore, in the present exemplary embodiment, the angular velocity data is compared with the two thresholds, and the stepwise control is performed; however, the angular velocity data may be compared with three or more thresholds and the stepwise control may be performed. Alternatively, a table in which the angular velocity data is associated with the ratio of the object angular acceleration until exposure that is reflected when the relative object angular velocity during exposure is determined, may be stored in a memory in the microcomputer 130, and the stepwise control may be performed based on the table.

Further, in the first and second exemplary embodiments, the angular acceleration is not calculated and is regarded as zero, and the relative object angular velocity during exposure is determined without reflecting the calculation result of the angular acceleration. Alternatively, the angular acceleration may be calculated but the relative object angular velocity during exposure may be determined without reflecting the calculation result of the angular acceleration at all.

In addition, in the first and second exemplary embodiments, the method of determining the relative object angular velocity during exposure is changed based on comparison between the angular velocity data and the thresholds. Alternatively, a method of determining the relative object angular velocity during exposure may be changed based on comparison between the object angular acceleration calculated with use of the angular velocity data and the thresholds.

Figure 11:
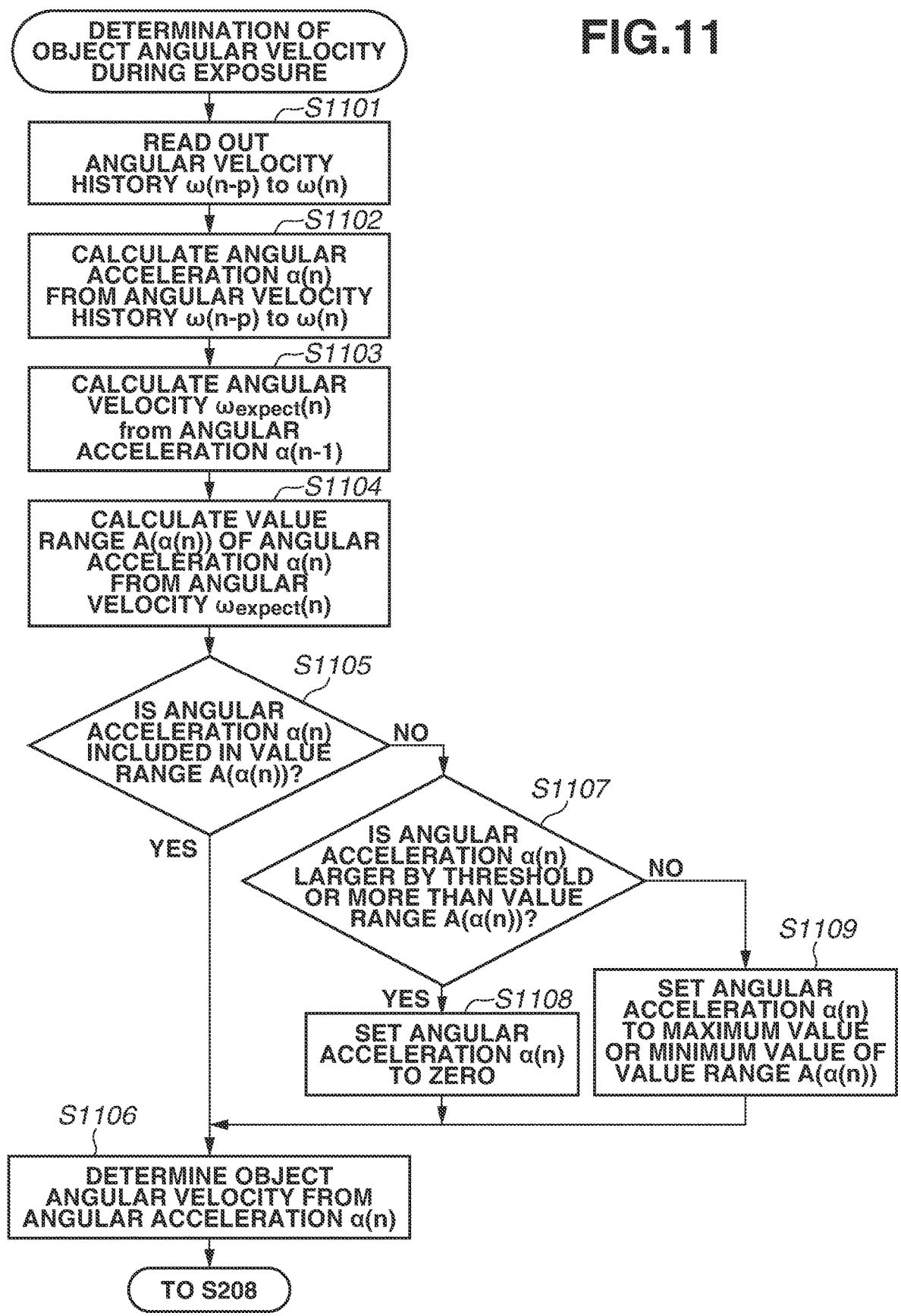
FIG. 11 is a diagram illustrating processing of determining object angular velocity during exposure according to one or more aspects of the present disclosure.

A third exemplary embodiment is described. FIG. 11 is a diagram illustrating a flowchart of the processing of determining the object angular velocity during exposure that is performed by the object angular velocity determination unit 603 in step S207 in FIG. 2, according to the third exemplary embodiment. The processing is performed by the object angular velocity determination unit 603 according to the follow shot assisting control program that is a computer program, and the processing is started when the object angular velocity determination unit 603 receives notification of the object angular velocity in step S206.

In step S1101, the object angular velocity determination unit 603 reads out the angular velocity history ω(n−p) to ω(n) (plurality of angular velocities) before exposure that has been calculated and accumulated by the object angular velocity calculation unit 134. The latest object angular velocity ω(n) is calculated in step S206 in FIG. 2, where n is equal to or larger than three and p is equal to or larger than one.

In step S1102, the object angular velocity determination unit 603 calculates angular acceleration α(n) that is the displacement amount per unit time, from the read angular velocity history ω(n−p) to ω(n), for example, with use of a least-squares method.

In step S1103, the object angular velocity determination unit 603 calculates (predicts), from the previously-calculated angular acceleration α(n−1), an angular velocity ωexpect(n) that expected at a calculation time of the object angular velocity ω(n).

In step S1104, the object angular velocity determination unit 603 calculates, from the calculated angular velocity ωexpect(n), a value range (range of possible value) A(α(n)) of the angular acceleration α(n).

A method of calculating the value range A(α(n)) is described with reference to FIG. 9. A reference symbol v denotes the object speed, a reference symbol L denotes the shortest distance between the moving trajectory of the object and the camera, and a reference symbol t denotes a moving time from a point of the object to a point at which the distance between the moving trajectory of the object and the camera becomes the shortest.

The angular velocity ω of the object is a time differential of the panning angle θ and is expressed by the following expression, $$\omega = \frac{d\theta}{dt} \quad \text{(Numerical expression 1)}$$

and the following expression is established from FIG. 9.

$$\tan\theta = \frac{vt}{L} \leftrightarrow \theta = \tan^{-1}\left(\frac{vt}{L}\right) \ (-90° < \theta < 90°) \quad \text{(Numerical expression 2)}$$

At this time, when the following expression is established, $$u_1 = \frac{vt}{L} \quad \text{(Numerical expression 3)}$$

the numerical expression 1 is modified to the following expression.

$$\omega = \quad \text{(Numerical expression 4)}$$
$$\frac{d\theta}{dt} = \frac{d\theta}{du_1} \cdot \frac{du_1}{dt} = \left(\frac{1}{1+u_1^2}\right) \cdot \left(\frac{v}{L}\right) = \frac{Lv}{L^2 + (vt)^2}$$

Further, the angular acceleration α of the object is a time differential of the angular velocity ω and is expressed by the following expression.

$$\alpha = \frac{d\omega}{dt} \quad \text{(Numerical expression 5)}$$

At this time, when the following expression is established, $$u_2 = L^2 + (vt)^2 \quad \text{(Numerical expression 6)}$$

the numerical expression 5 is modified to the following expression.

$$\alpha = \frac{d\omega}{dt} = \quad \text{(Numerical expression 7)}$$
$$\frac{d\omega}{du_2} \cdot \frac{du_2}{dt} = \left(\frac{-Lv}{u_2^2}\right) \cdot (2v^2 t) = \frac{-2Lv^3 t}{(L^2 + (vt)^2)^2}$$

When the angular acceleration α is expressed by an expression of the angular velocity ω, the following expression is established.

$$\alpha = \frac{-2Lv^3 t}{(L^2 + (vt)^2)^2} = \quad \text{(Numerical expression 8)}$$
$$\left(\frac{Lv}{L^2 + (vt)^2}\right)^2 \cdot \left(\frac{-2v}{L}\right) \cdot t = \omega^2 \cdot \left(\frac{-2v}{L}\right) \cdot t$$

Further, when the angular acceleration α is expressed by an expression of the angular velocity ω and the panning angle θ with use of the numerical expression 2, the following expression is established.

$$\alpha = \omega^2 \cdot \left(\frac{-2v}{L}\right) \cdot \left(\frac{L}{v}\tan\theta\right) = -2\omega^2 \tan\theta \quad \text{(Numerical expression 9)}$$

At this time, as illustrated in FIG. 8, the angular acceleration becomes the minimum when the panning angle θ is −30 degrees, and the angular acceleration becomes the maximum when the panning angle θ is +30 degrees, and ωexpect(n) is the angular velocity at each angle. Accordingly, the angular acceleration α(n) is inevitably included in the value range A(α(n)) expressed by the following expression.

$$-\frac{2}{\sqrt{3}}(\omega_{expect}(n))^2 \le \alpha(n) \le \frac{2}{\sqrt{3}}(\omega_{expect}(n))^2 \quad \text{(Numerical expression 10)}$$

Alternatively, when a domain of the panning angle θ is determined, the value range A(α(n)) is more detailed.

In step S1105, the object angular velocity determination unit 603 determines whether the angular acceleration α(n) is included in the value range A(α(n)). In a case where the angular acceleration α(n) is included in the value range A(α(n)) (YES in step S1105), the processing proceeds to step S1106, and otherwise (NO in step S1105), the processing proceeds to step S1107.

In step S1107, the object angular velocity determination unit 603 determines whether the difference between the angular acceleration α(n) and the value range A(α(n)) is equal to or larger than a threshold. When the difference is equal to or larger than the threshold (YES in step S1107), the processing proceeds to step S1108, and otherwise (NO in step S1107), the processing proceeds to step S1109.

In step S1108, the object angular velocity determination unit 603 sets the value of the angular acceleration α(n) to zero. This is synonymous with stoppage of the determination (prediction) of the object angular velocity in step S1106 described below. After the angular acceleration α(n) is set, the processing proceeds to step S1106.

In step S1109, the object angular velocity determination unit 603 sets the value of the angular acceleration α(n) to a close value from among the maximum value and the minimum value of the value range A(α(n)). After the angular acceleration α(n) is set, the processing proceeds to step S1106.

In step S1108, the object angular velocity determination unit 603 sets the value of the angular acceleration α(n) to zero. Alternatively, the object angular velocity determination unit 603 may simply set the value of the angular acceleration α(n) to any exceptional value, and cause the follow shot control unit 132 to determine the exceptional value in step S210 in FIG. 2, thereby stopping the follow shot assisting. Alternatively, a step of determining whether the number of times in which the angular acceleration α(n) is not included in the value range A (α(n)) is equal to or larger than a second threshold, may be newly provided. When the number of times is equal to or larger than the second threshold, any exceptional value stopping the follow shot assisting may be set.

In step S1106, the object angular velocity determination unit 603 uses the angular acceleration α(n) to determine (predict) the object angular velocity.

As described above, according to the present exemplary embodiment, the object angular velocity predicted in consideration of the value range of the angular acceleration, which makes it possible to suppress influence of the error of the moving amount of the object on the image plane detected from the temporally-continuous images and to correct blur of the object.

Further, in the first to third exemplary embodiments, the example of the lens-integrated camera has been described; however, the camera may be a lens interchangeable camera and an angular velocity sensor provided in an interchangeable lens may be used.

Moreover, in the first to third exemplary embodiments, the example in the case where the follow shot assisting mode is set according to the operation by the user has been described; however, the camera may determine movement of the camera, and automatically make a transition to the follow shot assisting mode.

Further, in the first to third exemplary embodiments, the example in which the shift lens is used as the correction component to correct the difference between the moving speed of the object and the panning speed, has been described. Alternatively, an image sensor may be used as the correction component, and the image sensor may be moved to correct the difference between the moving speed of the object and the panning speed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Applications No. 2017-125530, filed Jun. 27, 2017, and No. 2017-219344, filed Nov. 14, 2017, which are hereby incorporated by reference herein in their entirety.

What is claimed is:

1. An imaging apparatus capable of performing a follow shot, the imaging apparatus comprising:
at least one processor, the at least one processor functioning, according to a program stored in a memory, as:
a first detection unit configured to detect a motion vector of an object, based on temporally-continuous images obtained by an image sensor,
a second detection unit configured to detect motion of the imaging apparatus,
a first calculation unit configured to calculate angular velocity of the object to the imaging apparatus, based on a detection result of the first detection unit and a detection result of the second detection unit,
a second calculation unit configured to calculate angular acceleration of the object to the imaging apparatus, based on a plurality of angular velocities calculated by the first calculation unit, and
a correction unit configured to move a correction component based on the angular velocity of the object to the imaging apparatus during exposure by the image sensor, and to correct image blur of the object,
wherein the correction unit changes, according to the detection result of the second detection unit, a ratio of a calculation result of the second calculation unit reflected when the angular velocity of the object to the imaging apparatus during exposure by the image sensor used in control of the correction component is determined.

2. The imaging apparatus according to claim 1,
wherein the second detection unit is configured to detect angular velocity data of the imaging apparatus, and
wherein the correction unit changes the ratio of the calculation result of the second calculation unit according to a value of the angular velocity data detected by the second detection unit.

3. The imaging apparatus according to claim 2, wherein, in a case where an absolute value of the angular velocity data detected by the second detection unit is equal to or lower than a first threshold, the correction unit determines the angular velocity of the object to the imaging apparatus during exposure by the imaging apparatus used in the control of the correction component, without reflecting the calculation result of the second calculation unit.

4. The imaging apparatus according to claim 3, wherein, in a case where the absolute value of the angular velocity data detected by the second detection unit is larger than the first threshold, the correction unit determines the angular velocity of the object to the imaging apparatus during exposure by the image sensor used in the control of the correction component, based on a calculation result of the first calculation unit and the calculation result of the second calculation unit.

5. The imaging apparatus according to claim 2, wherein the correction unit changes the ratio of the calculation result of the second calculation unit in a stepwise manner according to the value of the angular velocity data detected by the second detection unit.

6. The imaging apparatus according to claim 1, wherein the correction unit changes angular acceleration that is used to determine the angular velocity of the object to the imaging apparatus during exposure by the image sensor, according to whether the angular acceleration calculated by the second calculation unit is included within a value range corresponding to the angular velocity calculated by the first calculation unit.

7. The imaging apparatus according to claim 6, wherein the correction unit uses the angular acceleration calculated by the second calculation unit to determine the angular velocity of the object to the imaging apparatus during exposure in a case where the angular acceleration calculated by the second calculation unit is included in the value range, and the correction unit uses angular acceleration set to a predetermined value, to determine the angular velocity of the object to the imaging apparatus during exposure in a case where the angular acceleration calculated by the second calculation unit is not included in the value range.

8. The imaging apparatus according to claim 7, wherein, in the case where the angular acceleration calculated by the second calculation unit is not included in the value range, the correction unit determines the predetermined value based on at least one of a difference between the angular acceleration calculated by the second calculation unit and the value range, and a number of times the angular acceleration calculated by the second calculation unit is not included in the value range.

9. The imaging apparatus according to claim 8, wherein the correction unit determines the predetermined value to a value included in the value range.

10. The imaging apparatus according to claim 6, wherein the correction unit calculates the value range based on at least one of an angle, the angular velocity, the angular acceleration, and a distance of the object to the imaging apparatus, speed of the object, and a moving time of the object.

11. The imaging apparatus according to claim 1, wherein the correction component is the image sensor.

12. The imaging apparatus according to claim 1, wherein the correction component is a lens.

13. A method of controlling an imaging apparatus capable of performing a follow shot, the method comprising:

performing first detection to detect a motion vector of an object, based on temporally-continuous images obtained by an image sensor;

performing second detection to detect motion of the imaging apparatus;

performing first calculation to calculate angular velocity of the object to the imaging apparatus, based on a detection result of the first detection and a detection result of the second detection;

performing second calculation to calculate angular acceleration of the object to the imaging apparatus, based on a plurality of angular velocities calculated by the first calculation; and moving a correction component based on the angular velocity of the object to the imaging apparatus during exposure by the image sensor, and correcting image blur of the object, wherein correcting includes changing, according to the detection result of the second detection, a ratio of a calculation result of the second calculation reflected when the angular velocity of the object to the imaging apparatus during exposure by the image sensor used in control of the correction component is determined.

* * * * *